(12) United States Patent
Kim

(10) Patent No.: US 8,259,224 B2
(45) Date of Patent: Sep. 4, 2012

(54) METHOD OF SETTING POSITION OF IMAGING DEVICE

(75) Inventor: Young-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 12/776,479

(22) Filed: May 10, 2010

(65) Prior Publication Data

US 2010/0283891 A1 Nov. 11, 2010

(30) Foreign Application Priority Data

May 8, 2009 (KR) .................. 10-2009-0040289

(51) Int. Cl.
*H04N 5/225* (2006.01)
(52) U.S. Cl. ........................ 348/374; 348/340
(58) Field of Classification Search .................. 348/340, 348/374

See application file for complete search history.

(56) References Cited

U.S. PATENT DOCUMENTS

| | | | |
|---|---|---|---|
| 2005/0285973 A1* | 12/2005 | Singh et al. | 348/374 |
| 2007/0183773 A1* | 8/2007 | Aoki et al. | 396/529 |
| 2007/0223913 A1* | 9/2007 | Lee | 396/529 |

\* cited by examiner

*Primary Examiner* — Tuan Ho
*Assistant Examiner* — Shahbaz Nazrul
(74) *Attorney, Agent, or Firm* — Drinker Biddle & Reath LLP

(57) ABSTRACT

A method of setting a location of an imaging device includes (a) preparing a base unit, the base unit including a lens and a mounting boss; (b) mounting an imaging device, on which a reference point is formed, to a circuit board; (c) forming a mounting hole at a predetermined location of the circuit board based on the reference point of the imaging device; and (d) mounting the circuit board to the base unit by inserting the mounting boss into the mounting hole.

16 Claims, 4 Drawing Sheets

METHOD OF SETTING POSITION OF IMAGING DEVICE

CROSS-REFERENCE TO RELATED PATENT APPLICATION

This application claims the priority benefit of Korean Patent Application No. 10-2009-0040289, filed on May 8, 2009, in the Korean Intellectual Property Office, the disclosure of which is incorporated herein in its entirety by reference.

BACKGROUND

1. Field of the Invention

The invention relates to a method of setting a position of an imaging device, and more particularly, to a method of accurately setting a position of an imaging device.

2. Description of the Related Art

Recently, photographing apparatuses, such as digital still cameras and digital video cameras, have become popular.

Such photographing apparatuses generally include an optic system including a lens unit, an imaging device which is disposed at a side of the lens unit, an image processing unit which processes electric signals received from the imaging device, and a memory which stores captured images.

General operations of a conventional photographing apparatus are as described below.

When a user captures an image, image light of a subject passes through a lens unit and is incident to an imaging device, such as a charge coupled device (CCD). The imaging device converts the incident image light to electrical image signals. An image processing unit in a photographing apparatus processes the image signals, and a memory stores the captured image.

Meanwhile, it is important to accurately set a location of an imaging device during a process of assembling for a photographing apparatus to obtain a high-resolution image. In other words, when an imaging device is being set, it is necessary to center the imaging device in the direction of light axis with respect to lenses in an optic system and to suitably align the imaging device horizontally.

A known example of conventional methods of setting a location of an imaging device is a method including setting parts to be assembled on a jig, the parts including the imaging device, accurately adjusting the location of the parts and fixing the parts by using an assistant plate, and fixing and installing an assistant plate and the parts, which are integrated as a single body, in a lens barrel.

The location of an imaging device is also related to resolutions of the imaging device, lens shading, etc., and also affects an overall process of manufacturing a photographing apparatus. Thus, a technology for accurately adjusting and setting the location of an imaging device with reduced costs and a reduced number of operations is required.

SUMMARY

Embodiments of the invention include a method of accurately and easily setting a position of an imaging device.

In an embodiment, a method of setting a location of an imaging device includes (a) preparing a base unit, the base unit including a lens and a mounting boss; (b) mounting an imaging device, on which a reference point is formed, to a circuit board; (c) forming a mounting hole at a predetermined location of the circuit board based on the reference point of the imaging device; and (d) mounting the circuit board to the base unit by inserting the mounting boss into the mounting hole.

The base unit may include a lens barrel, and the lens may be disposed in the lens barrel.

The mounting boss may protrude toward the circuit board.

The imaging device may include at least one of a CCD (charge coupled device) and a CMOS (complementary metal oxide semiconductor).

The imaging device may be attached to the circuit board by using SMT (surface-mount technology).

The circuit board may include a FPCB (flexible printed circuit board).

The method may further include attaching a reinforcement unit to the circuit board prior to the (b) mounting of the imaging device.

An installation hole may be formed in the reinforcement unit, so that the mounting boss is inserted into the installation hole.

A size of the installation hole may be decided such that, when the mounting boss is inserted into the installation hole, a predetermined gap exists between inner walls of the installation hole and sidewalls of the mounting boss.

The method may further include disposing and hardening an adhesive in the installation hole to fix the circuit board to the mounting boss.

The adhesive may be include an ultraviolet ray hardening type adhesive.

During the (c) forming of the mounting hole, a location to form the mounting hole may be determined based on the location of the reference point of the imaging device and the location of the lens.

During the (c) forming of the mounting hole, the mounting hole may be formed in relation to the reference point of the imaging device.

During the (c) forming of the mounting hole, the mounting hole may be formed using a drilling method, such as a mechanical drilling method or a laser drilling method.

The method may further include disposing and hardening an adhesive around the mounting hole to fix the circuit board to the mounting boss, after the (d) mounting of the circuit board to the base unit.

The adhesive may include an ultraviolet ray hardening type adhesive.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, embodiments of the invention will be described in detail with reference to the attached drawings.

Figure 1:
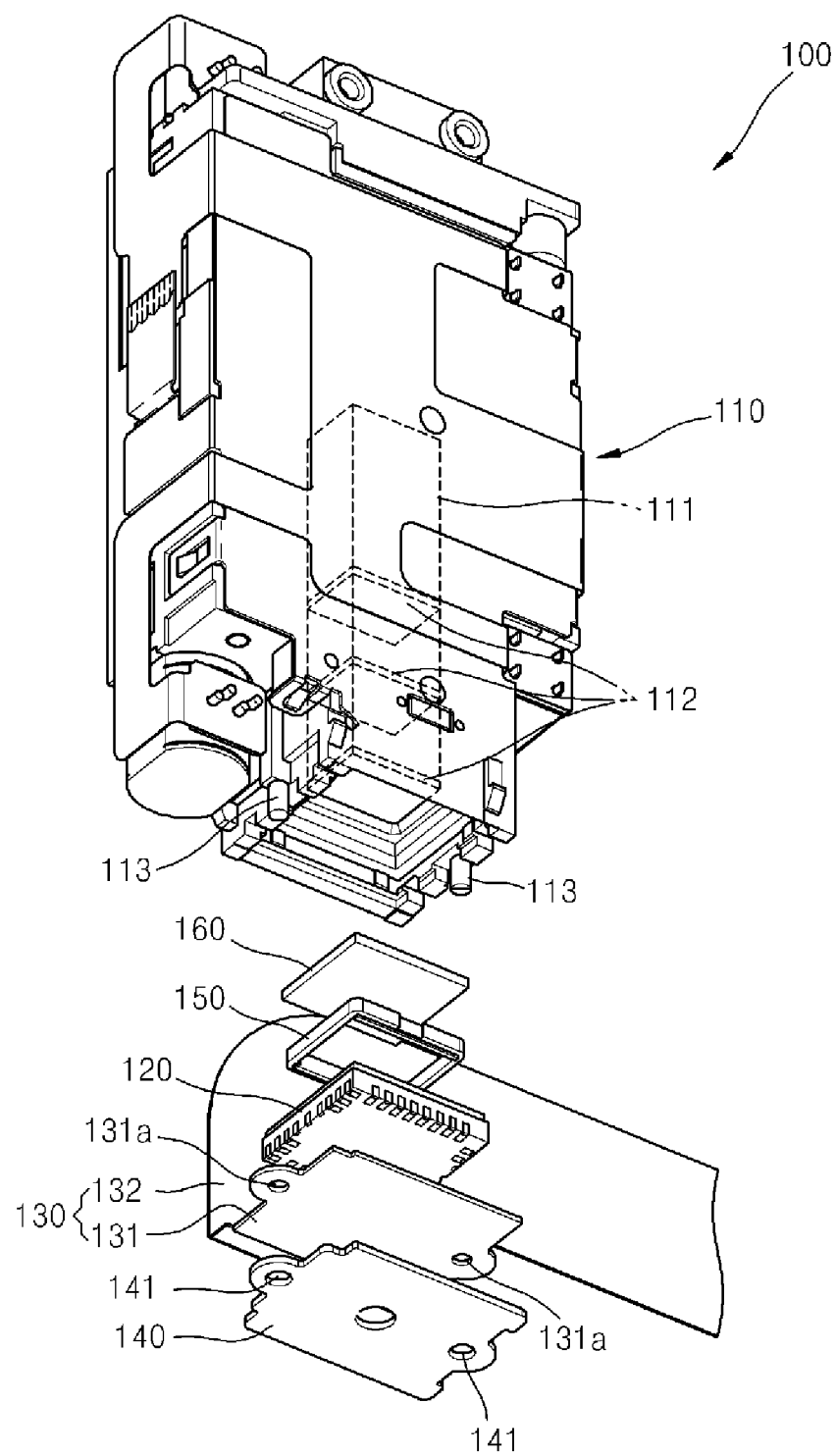
FIG. 1 is an exploded perspective view of a photographing apparatus, according to an embodiment of the invention.

FIG. 1 is an exploded perspective view of a photographing apparatus 100, according to an embodiment of the invention.

As shown in FIG. 1, the photographing apparatus 100 includes a base unit 110, an imaging device 120, a circuit board 130, a reinforcement unit 140, an elastic pad 150, and a filter 160.

A lens barrel 111 is disposed on the base unit 110, and a lens unit 112 is disposed in the lens barrel 111.

The lens unit 112 includes various lenses, such as a zoom lens and a focus lens, and an iris.

Two mounting bosses 113 are symmetrically formed on the bottom surface of the base unit 110.

The mounting boss 113 has a cylindrical shape, and protrudes toward the circuit board 130.

Although the mounting boss 113 according to the embodiment illustrated in FIG. 1 is formed to have a cylindrical shape, the invention is not limited thereto. In other words, a mounting boss according to embodiments of the invention is not limited in terms of its shape. For example, the shape of a mounting boss according to embodiments of the invention may include a rectangular pillar.

According to the embodiment illustrated in FIG. 1, the number of mounting bosses 113 that are formed on the bottom surface of the base unit 110 is two. However, the invention is not limited thereto. In other words, any number of mounting bosses 113 may be formed on the bottom surface of the base unit 110 as long as the mounting bosses 113 firmly support the circuit board 130 and the reinforcement unit 140. For example, the number of mounting bosses 113 that are mounted on the bottom surface of the base unit 110 may be three, four, or more.

Meanwhile, an image light from outside the photographing apparatus 100 passes through the lens unit 112 and is incident on the imaging device 120, wherein a charge coupled device (CCD) is used as the imaging device 120.

Although a CCD is used as the imaging device 120 according to the embodiment illustrated in FIG. 1, the invention is not limited thereto. In other words, a complementary metal oxide semiconductor (CMOS) or another image sensor may be used as the imaging device 120. Here, if a CMOS device is used as the imaging device 120, the imaging device 120 may convert an image light of a subject to electrical signals faster than a CCD device, and thus time taken to photograph a subject may be reduced.

Meanwhile, the circuit board 130 is disposed on the bottom surface of the imaging device 120. The imaging device 120 is attached to the circuit board 130 by using surface-mount technology (SMT).

The circuit board 130 is formed of a flexible printed circuit board (FPCB), is electrically connected to the imaging device 120, and transmits electrical image signals output from the imaging device 120 to an image processing unit (not shown) in the photographing apparatus 100.

The circuit board 130 according to the embodiment illustrated in FIG. 1 includes a supporting unit 131 and a connection unit 132. The supporting unit 131 is a unit to which the imaging device 120 is directly mounted by using the SMT, and the connection unit 132 is a unit which electrically connects the supporting unit 131 and the image processing unit (not shown).

Two mounting holes 131a are formed in the supporting unit 131. Protrusions of the mounting boss 113 are inserted into the mounting holes 131a, and thus the circuit board 130 is fixed to the base unit 110.

After the imaging device 120 is attached to the circuit board 130 by using the SMT, the circuit board 130 is fixed to the base unit 110. Thus, the locations of the mounting holes 131a are closely related to the location of the imaging device 120. This is because relative locations of the imaging device 120 and the lens unit 112 of the base unit 110 depend on the locations of the mounting holes 131a. A method of determining where to form the mounting holes 131a will be described in detail below.

The circuit board 130 according to the embodiment illustrated in FIG. 1 is formed of a flexible printed circuit board (FPCB). However, the invention is not limited thereto. In other words, a circuit board according to embodiments of the invention may be formed of a rigid printed circuit board (RPCB).

Meanwhile, the reinforcement unit 140 is attached to the rear surface of the circuit board 130.

The reinforcement unit 140 is either a thin metal plate or a thin resin plate, and is attached to the supporting unit 131 to prevent the circuit board 130 from being deformed when the imaging device 120 is attached to the supporting unit 131 by using the SMT. In other words, the reinforcement unit 140 is attached to the supporting unit 131 in advance, before the imaging device 120 is mounted on the circuit board 130.

Two installation holes 141 are formed in the reinforcement unit 140, and the mounting bosses 113 are inserted into the installation holes 141. The installation holes 141 are formed to have a size larger than a size of a cross-section of the mounting bosses 113. In other words, the installation holes 141 are formed to have an inner diameter greater than a diameter of the mounting bosses 113. Thus, when the mounting bosses 113 are inserted into the installation holes 141, predetermined gaps exist between the mounting bosses 131 and the installation holes 141, and an adhesive 170 (see FIGS. 6 and 7) is applied into the gaps. Here, the gaps may have any width as long as the adhesive 170 may be sufficiently applied.

According to the embodiment illustrated in FIG. 1, the reinforcement unit 140 is attached on the rear surface of the circuit board 130. However, the invention is not limited thereto. In other words, a reinforcement unit may be omitted in a circuit board according to embodiments of the invention. In this case, the circuit board 130 is formed of a suitable material and has a sufficient thickness, so that the circuit board 130 will not be deformed by the SMT processing.

Meanwhile, the elastic pad 150 is disposed between the base unit 110 and the imaging device 120, and is formed of a silicon family resin that has elasticity.

The elastic pad 150 is disposed such that a first surface of the elastic pad 150 contacts the filter 160 and a second surface of the elastic pad 150 contacts the imaging device 120.

The elastic pad 150 has a predetermined elasticity. The location of the imaging device 120 may be easily adjusted due to the elasticity of the elastic pad 150 when a worker sets the imaging device 120.

The elastic pad 150 is formed to have a rectangular ring shape, so that image light, which passes through the lens unit 112, may easily be incident on the imaging device 120.

Although the elastic pad 150 is formed to have a rectangular ring shape according to the embodiment illustrated in FIG. 1, the invention is not limited thereto. In other words, an elastic pad according to embodiments of the invention may have any shape as long as the elastic pad closely contacts the outer perimeter of the imaging device 120 at least partially and an image light may be incident on the imaging device 120 with little loss. For example, the shape of an elastic pad according to embodiments of the invention may be a circular ring or a plurality of circular arcs that are irregularly apart from each other.

The filter 160 is disposed between the lens unit 112 and the elastic pad 150.

The filter 160 is an infrared ray blocking filter, and has a shape of a thin film or a glass plate.

Although one infrared ray blocking filter is used as the filter 160 according to the embodiment illustrated in FIG. 1, the invention is not limited thereto. In other words, there are no limits in numbers and types of filters that may be used in embodiments of the invention. In other words, two or more filters may be used according to embodiments of the invention, and the filters may be any types of filters, such as ultraviolet ray blocking filter, color correcting filters, etc. Furthermore, in the case where one filter is used, the filter may be a filter having a plurality of layers each of which has a function that is different from that of other layers.

Hereinafter, a method of setting the location of the imaging device 120 according to an embodiment of the invention will be described in reference to FIGS. 2 through 7.

Figure 2:
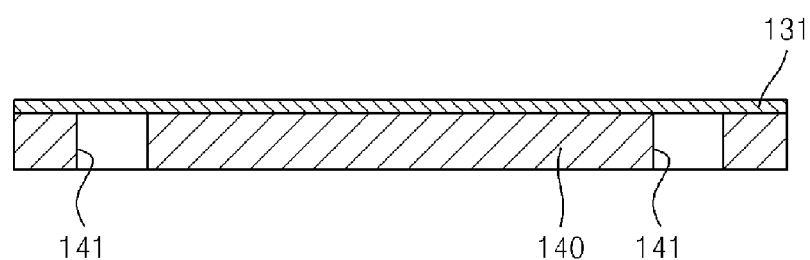
FIG. 2 is a cross-sectional view showing that a reinforcement unit is attached to a circuit board, according to an embodiment of the invention.
Figure 3:
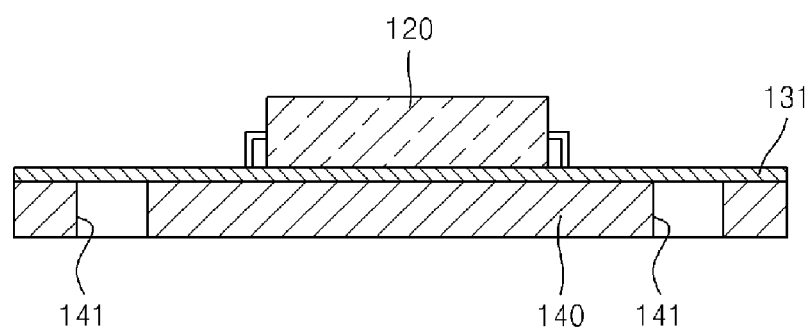
FIG. 3 is a cross-sectional view showing that an imaging device is attached to the circuit board to which the reinforcement unit is attached, according to an embodiment of the invention.
Figure 4:
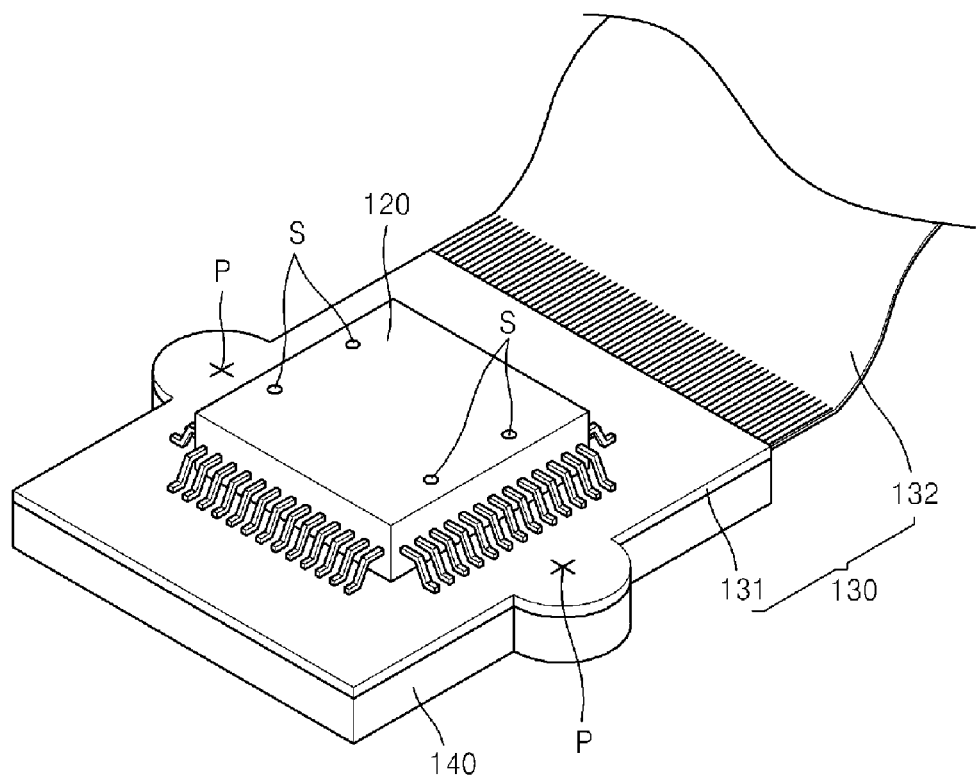
FIG. 4 is a perspective view showing locations that are determined to form mounting holes on the circuit board of FIG. 3, according to an embodiment of the invention.
Figure 5:
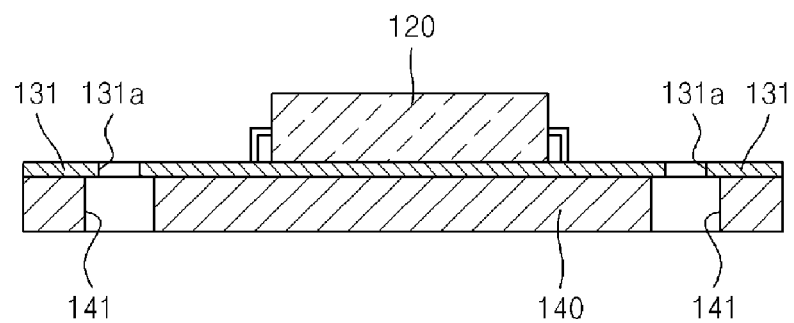
FIG. 5 is a cross-sectional view showing the mounting holes formed in the circuit board, according to an embodiment of the invention.
Figure 6:
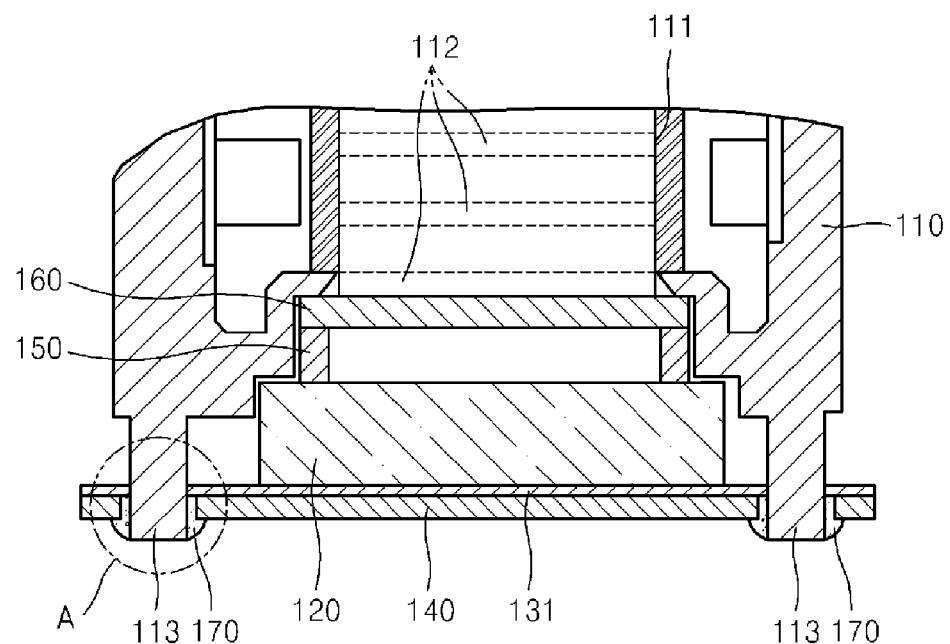
FIG. 6 is a cross-sectional view showing that the circuit board is mounted to the base unit, according to an embodiment of the invention.
Figure 7:
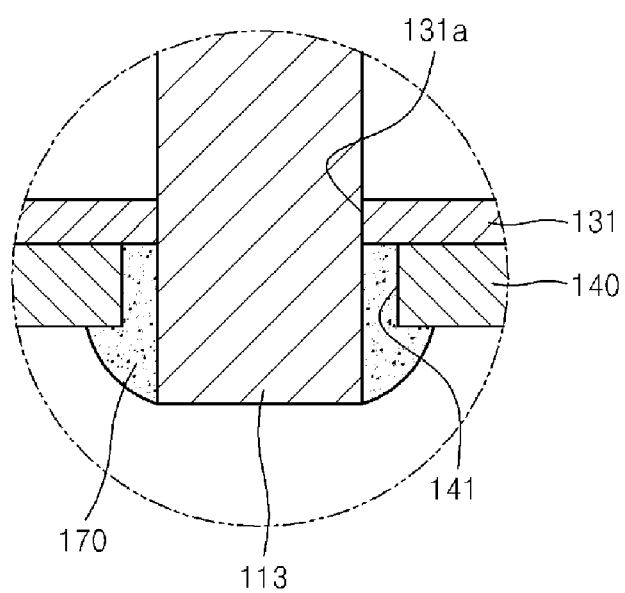
FIG. 7 is a conceptual view showing the portion A of FIG. 6 in closer detail.

FIG. 2 is a cross-sectional view showing that a reinforcement unit 140 is attached to a circuit board 130, according to an embodiment of the invention. FIG. 3 is a cross-sectional view showing that an imaging device 120 is attached to the circuit board 130 to which the reinforcement unit 140 is attached, according to an embodiment of the invention. FIG. 4 is a perspective view showing locations that are determined to form mounting holes on the circuit board of FIG. 3, according to an embodiment of the invention. FIG. 5 is a cross-sectional view showing the mounting holes 131a formed in the circuit board 130, according to an embodiment of the invention. FIG. 6 is a cross-sectional view showing that the circuit board 130 is mounted to the base unit 110, according to an embodiment of the invention. FIG. 7 is a conceptual view showing the portion A of FIG. 6 in closer detail.

First, as shown in FIG. 2, a worker attaches and fixes the reinforcement unit 140, in which the installation holes 141 are formed, to the supporting unit 131 of the circuit board 130. Here, the reinforcement unit 140 is attached and fixed to the supporting unit 131 by using an adhesive, etc.

According to the embodiment illustrated in FIG. 2, the reinforcement unit 140 is attached to the circuit board 130 by using an adhesive, etc. However, the invention is not limited thereto. In other words, a reinforcement unit 140 may be fixed to a circuit board 130 by using any method. For example, a reinforcement unit 140 may be fixed to a circuit board 130 by using a thermal bonding method or an ultrasonic bonding method.

Next, as shown in FIG. 3, the worker mounts the imaging device 120 on the top surface of the supporting unit 131 of the circuit board 130 by using the SMT. As described above, since the reinforcement unit 140 is attached to the supporting unit 131, the circuit board 130 is not deformed even if the imaging device 120 is mounted by using the SMT.

Next, as shown in FIG. 4, the worker determines locations P to form the mounting holes 131a in the supporting unit 131 of the circuit board 130.

In other words, a reference point S is formed on the top surface of the imaging device 120, wherein the reference point S is marked in advance by the manufacturer of the imaging device 120 for adjusting a relative location of the imaging device 120 with respect to the lens unit 112. Based on the reference point S, the worker determines the locations P to form the mounting holes 131a to maximize resolutions of the imaging device 120. Here, the worker determines the locations P to form the mounting holes 131a based on relative locations of the lens unit 112 and the mounting bosses 113 and relative locations of the mounting bosses 113 and the imaging device 120.

Once the locations P to form the mounting holes 131a are determined, the locations P are marked on the supporting unit 131, so that a drilling operation may be performed on the marked locations P later.

According to the embodiment illustrated in FIG. 4, after the worker determines the locations P to form the mounting holes 131a based on the reference point S of the imaging device 120, the worker marks the locations P on the supporting unit 131, and performs the drilling operation thereon. However, the invention is not limited thereto. In other words, according to embodiments of the invention, the worker may perform the drilling operation immediately as the locations P to form the mounting holes 131a are determined based on the reference point S. In other words, the worker may determine the locations P to form the mounting holes 131a by looking at the reference point S and immediately perform the drilling operation.

Next, as shown in FIG. 5, the worker performs the drilling operation on the marked locations P to form the mounting holes 131a.

The drilling operation may be performed using methods such as mechanical drilling and laser drilling. Here, the diameter and the shape of the mounting holes 131a may be identical to those of the cross-section of the mounting bosses 113, so that no shaking occurs when the mounting bosses 113 are inserted into the mounting holes 131a.

Next, as shown in FIGS. 6 and 7, the circuit board 130, in which the mounting holes 131a are formed, is mounted on the base unit 110.

In other words, the elastic pad 150 and the filter 160 are disposed on the imaging device 120, and the mounting bosses 113 of the base unit 110 are inserted into the mounting holes 131a. As a result, the imaging device 120 is disposed at an optimal location with respect to the location of the lens unit 112 of the base unit 110, because, as described above, the worker determines the locations of the mounting holes 131a in consideration of the optimal location for arranging the imaging device 120.

Next, the adhesive 170 is applied into the installation holes 141 and is hardened, and thus the circuit board 130 is finally fixed to the base unit 110. In other words, since the size of the installation holes 141 are larger than the size of the cross-sections of the mounting bosses 113, there are gaps between the installation holes 141 and the mounting bosses 113, and the installation holes 141 and the mounting bosses 113 are fixed to each other by applying the adhesive 170 in the gap and around the installation holes 141 and hardening the applied adhesive 170.

According to the embodiment illustrated in FIGS. 6 and 7, an ultraviolet ray hardening type adhesive is used as the adhesive 170. Therefore, after disposition of the adhesive 170, an ultraviolet ray is irradiated thereto to completely harden the applied adhesive 170.

Although an ultraviolet ray hardening type adhesive is used as the adhesive 170 according to the embodiment illustrated in FIGS. 6 and 7, the invention is not limited thereto. In other words, various types of adhesives may be used as an adhesive according to embodiments of the invention. For example, general solvent evaporization type adhesives or infrared ray hardening type adhesives may be used as the adhesive 170.

According to the embodiment illustrated in FIGS. 6 and 7, the circuit board 130 is finally fixed to the base unit 110 by disposing the adhesive 170 in the installation holes 141. However, the invention is not limited thereto. In other words, according to embodiments of the invention, the adhesive 170 may not be applied in the installation holes 141. In this case, the circuit board 130 is fixed to the base unit 110 by simply fitting the circuit board 130 to the base unit 110. In this case, the mounting holes 131a are formed to have diameters slightly smaller than the diameters of the mounting bosses 113, so that the circuit board 130 may be fixed to the base unit 110 by a tight or interference fit. Furthermore, in the case where the reinforcement unit 140 is omitted in embodiments of the invention, the installation holes 141 do not exist. In this case, the circuit board 130 may be finally fixed to the base unit 110 by applying the adhesive 170 around the mounting holes 131a. Alternatively, the circuit board 130 may also be finally fixed to the base unit 110 by simply fitting the circuit board 130 to the base unit 110 without disposing the adhesive 170.

Although the method of setting the location of an imaging device is described above under an assumption that the operations are performed by a human worker, it is clear that the method may also be applied to automatic operations performed by robots, etc.

As described above, according to the method of setting the location of an imaging device according to the embodiments described herein, the mounting holes 131a are formed in the circuit board 130 based on a reference point of the imaging device 120 after the imaging device 120 is mounted on the circuit board 130 by using the SMT, and then the circuit board 130 may be attached to the mounting bosses 113 via the mounting holes 131a. As a result, the imaging device 120 may be accurately mounted at an optimal location with respect to the lens unit 112. Thus, not only resolutions of the imaging device 120 may be improved, but also a lens shading problem may be resolved.

Furthermore, the method of setting the location of an imaging device according to the embodiments illustrated employs simple and efficient operations. Thus, as compared to conventional methods, the number of operations is reduced. Furthermore, additional adjustment units, such as a jig, an assistant plate, etc., that are used for adjustment of the location of an imaging device in the conventional methods are not necessary, and thus overall costs for labour and parts may be reduced.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Moreover, no item or component is essential to the practice of the invention unless the element is specifically described as "essential" or "critical".

As these embodiments of the invention are described with reference to illustrations, various modifications or adaptations of the methods and or specific structures described may become apparent to those skilled in the art. All such modifications, adaptations, or variations that rely upon the teachings of the invention, and through which these teachings have advanced the art, are considered to be within the spirit and scope of the invention. Hence, these descriptions and drawings should not be considered in a limiting sense, as it is understood that the invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. A method of setting a location of an imaging device, the method comprising:
    (a) preparing a base unit, the base unit including a lens and a mounting boss;
    (b) mounting the imaging device, on which a reference point is formed in a surface of the imaging device during manufacture of the imaging device, to a circuit board;
    (c) forming a mounting hole in the circuit board based on the reference point of the mounted imaging device; and
    (d) mounting the circuit board to the base unit by inserting the mounting boss into the mounting hole.

2. The method of claim 1, wherein the base unit comprises a lens barrel, and the lens is disposed in the lens barrel.

3. The method of claim 1, wherein the mounting boss protrudes toward the circuit board.

4. The method of claim 1, wherein the imaging device includes at least one of a CCD (charge coupled device) or a CMOS (complementary metal oxide semiconductor).

5. The method of claim 1, wherein the imaging device is mounted to the circuit board using SMT (surface-mount technology).

6. The method of claim 1, wherein the circuit board includes a FPCB (flexible printed circuit board).

7. The method of claim 1, further comprising attaching a reinforcement unit to the circuit board prior to the (b) mounting of the imaging device.

8. The method of claim 7, wherein an installation hole is formed in the reinforcement unit, so that the mounting boss is inserted into the installation hole.

9. The method of claim 8, wherein a size of the installation hole is decided such that, when the mounting boss is inserted into the installation hole, a predetermined gap exists between inner walls of the installation hole and sidewalls of the mounting boss.

10. The method of claim 8, further comprising disposing and hardening an adhesive in the installation hole to fix the circuit board to the mounting boss.

11. The method of claim 10, wherein the adhesive includes an ultraviolet ray hardening type adhesive.

12. The method of claim 1, wherein, during the (c) forming of the mounting hole, a location to form the mounting hole is determined based on the location of the reference point of the imaging device and the location of the lens.

13. The method of claim 1, wherein, during the (c) forming of the mounting hole, the mounting hole is formed in relation to the reference point of the imaging device.

14. The method of claim 1, wherein, during the (c) forming of the mounting hole, the mounting hole is formed using a drilling method, such as a mechanical drilling method or a laser drilling method.

15. The method of claim 1, further comprising disposing and hardening an adhesive around the mounting hole to fix the circuit board to the mounting boss, after the (d) mounting of the circuit board to the base unit.

16. The method of claim 15, wherein the adhesive includes an ultraviolet ray hardening type adhesive.

* * * * *